UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF MAKING SILICON MONOXID

No. 886,636.　　　　　Specification of Letters Patent.　　　Patented May 5, 1908.

Application filed June 10, 1905. Serial No. 264,554.

*To all whom it may concern:*

Be it known that I, HENRY NOEL POTTER, a citizen of the United States, and resident of New Rochelle, county of Westchester, State of New York, have invented certain new and useful Improvements in Methods of Making Silicon Monoxid, of which the following is a specification.

I have discovered a novel method of making silicon monoxid which differs from that described in my original disclosure, constituting application No. 238,925, filed Dec. 30, 1904.

The method described in my original application may be said to consist in heating a mixture of silicon dioxid and carbon to a critical temperature in a partially filled inclosing chamber.

My new method consists in substituting for carbon or silicon as reducing agents appropriate quantities of light metals such as magnesium or aluminium. The process with magnesium may be represented by the expression

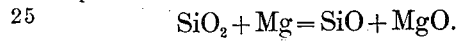

The reaction with aluminum may be expressed

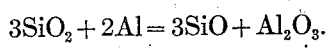

These reactions differ from the reaction with carbon in that the oxidation of the reducing agent gives a solid material instead of a gas, and this must be removed from mixture with the silicon monoxid whenever its presence is injurious. In the case of the magnesium reduction, the magnesia produced may be removed by leaching with hydrochloric acid. In the case of the aluminum, the $Al_2O_3$ formed may be removed by digesting with hydrofluoric acid, which attacks alumina more rapidly than it does silicon monoxid.

In practicing my invention, I mix appropriate quantities of granular (preferably finely granular) materials together and heat them in any suitable way, preferably with exclusion of air. At about a red heat, the reactions begin and propagate themselves through the mass.

It might be thought that sodium or potassium might be substituted for magnesium or aluminum, but these powerfully alkaline metals give caustic oxids which, while they are readily soluble in water, nevertheless give solutions which attack silicon monoxid. Silicon monoxid can, therefore, be produced in this way, but the process is attended with such difficulties as to be inferior in practicability to the processes based on magnesium or aluminum, herein specified.

In practicing my invention, I find that it is advantageous to exclude atmospheric oxygen, which may be done by substituting an inert gas such as carbon monoxide, or by operating under such reduced pressure as to constitute practically a vacuum, whereby the amount of oxygen present is reduced to a negligible quantity. Metallic calcium has also the necessary properties to act as a reducing agent, but is at present too expensive to be available.

In practicing my invention, it is obviously not necessary to perform all the reduction with a single reducing agent, as it is equally possible to use a mixture of aluminum and magnesium, or to combine the metallic reduction with reductions involving carbon or silicon as reducing agents.

As a further modification of an obvious nature, it is immaterial whether the mixture of two reducing agents (for example, aluminum and carbon, calcium and carbon, silicon and carbon, or silicon and magnesium) are simply mechanical mixtures, or whether they are chemical compounds. For example, it is possible to use, as I have stated in a former application, silicon carbid instead of silicon and carbon. In a similar manner, it is possible to use calcium carbid instead of calcium and carbon, or magnesium silicid instead of magnesium and silicon. Some of these compounds are now obtainable in the market, as for example, calcium carbid, and others such as magnesium silicid and the silicids of aluminum and calcium, can be readily produced.

I claim as my invention:

1. The method of producing silicon monoxid, which consists in mixing comminuted magnesium with comminuted silica and heating the mixture until ignition occurs.

2. The method of producing silicon monoxid, which consists in mixing silicon dioxid and a light metal and heating the mixture in an inert environment.

3. The method of producing silicon monoxid, which consists in mixing silicon dioxid and a light metal and heating the mixture to about a red heat.

4. The process of producing silicon monoxid, which consists in reacting upon silica with a metallic reducing agent, whereby the silica is partially reduced and the metal is oxidized, and subsequently removing the oxy compound of said metal.

Signed at New York, in the county of New York, and State of New York, this 7th day of June A. D. 1905.

HENRY NOEL POTTER.

Witnesses:
WM. H. CAPEL,
GEORGE H. STOCKBRIDGE.